United States Patent
Sun et al.

(10) Patent No.: US 12,185,392 B2
(45) Date of Patent: Dec. 31, 2024

(54) TRANSMISSION METHOD AND APPARATUS FOR WIRELESS NETWORK, COMMUNICATION NODE AND STORAGE MEDIUM

(71) Applicant: ZTE CORPORATION, Shenzhen (CN)

(72) Inventors: Sang Sun, Shenzhen (CN); Nan Li, Shenzhen (CN); Dan Yang, Shenzhen (CN); Zhiqiang Han, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 330 days.

(21) Appl. No.: 17/782,852

(22) PCT Filed: Jan. 21, 2021

(86) PCT No.: PCT/CN2021/072996
§ 371 (c)(1),
(2) Date: Jun. 6, 2022

(87) PCT Pub. No.: WO2021/147934
PCT Pub. Date: Jul. 29, 2021

(65) Prior Publication Data
US 2023/0007708 A1    Jan. 5, 2023

(30) Foreign Application Priority Data
Jan. 22, 2020   (CN) .......................... 202010075389.1

(51) Int. Cl.
*H04W 76/11*   (2018.01)
*H04B 7/022*   (2017.01)
*H04W 84/12*   (2009.01)

(52) U.S. Cl.
CPC ............ *H04W 76/11* (2018.02); *H04B 7/022* (2013.01); *H04W 84/12* (2013.01)

(58) Field of Classification Search
CPC ..... H04W 76/11; H04W 84/12; H04W 76/15; H04W 92/20; H04W 74/0816; H04W 28/00; H04B 7/022
See application file for complete search history.

(56) References Cited

U.S. PATENT DOCUMENTS

2018/0146469 A1* 5/2018 Luo ................... H04W 72/20
2019/0021091 A1* 1/2019 Ko ..................... H04W 74/002

FOREIGN PATENT DOCUMENTS

| CN | 105684540 A | 6/2016 |
|---|---|---|
| CN | 106788622 A | 5/2017 |

(Continued)

OTHER PUBLICATIONS

International Searching Authority. International Search Report and Written Opinion for PCT Application No. PCT/CN2021/072996 and English translation, mailed Apr. 12, 2021, pp. 1-9.

(Continued)

*Primary Examiner* — Kibrom T Hailu
(74) *Attorney, Agent, or Firm* — Vivacqua Crane, PLLC

(57) ABSTRACT

A transmission method and apparatus for a wireless network, a communication node and a non-transitory computer-readable storage medium are disclosed. The transmission method for a wireless network may include: receiving a physical-layer protocol data unit (PPDU) which carries first identifier information; and keeping a locally stored network allocation vector (NAV) unchanged, or updating the locally stored NAV and ignoring the updated NAV in a process of multi-access point transmission.

13 Claims, 4 Drawing Sheets

Generate a PPDU that includes a radio frame, the PPDU carrying first identifier information used to trigger multi-access point transmission ~210

Send the PPDU ~220

(56) References Cited

FOREIGN PATENT DOCUMENTS

| | | |
|---|---|---|
| CN | 106941731 A | 7/2017 |
| CN | 108353429 A | 7/2018 |
| WO | 2017012182 A1 | 1/2017 |

OTHER PUBLICATIONS

Japan Patent Office. Notice of Reasons for Refusal for JP Application No. 2022-533572 and English translation, mailed Jun. 13, 2023, pp. 1-8.
Kiseon Ryu/LG Electronics. "Consideration on multi/AP coordination for EHT," IEEE 802.11-18/1982r1, Jan. 2019, pp. 1-10.

* cited by examiner

Wireless station 1

TRANSMISSION METHOD AND APPARATUS FOR WIRELESS NETWORK, COMMUNICATION NODE AND STORAGE MEDIUM

CROSS-REFERENCE TO RELATED APPLICATION

This application is a national stage filing under 35 U.S.C. § 371 of international application number PCT/CN2021/072996, filed Jan. 21, 2021, which claims priority to Chinese patent application No. 202010075389.1, filed on Jan. 22, 2020. The contents of these applications are incorporated herein by reference in their entirety.

TECHNICAL FIELD

The present disclosure relates to a wireless communication network, for example, to a transmission method and an apparatus in a wireless network, a communication node, and a non-transitory computer-readable storage medium.

BACKGROUND

The next-generation Wireless Local Area Network (WLAN) supports multi-access point transmission between at least one access point (AP) and at least one wireless station (STA). For example, a specific AP or a trigger entity may send a data packet to trigger another access point to perform multi-access point transmission. In a process of multi-access point transmission, other listening stations that can receive the data packet each need to set a network allocation vector (NAV) according to information included in the data packet, and cannot send data when the NAV is not zero, thereby avoiding collision with a communication node participating in the multi-access point transmission. In this case, if a communication node sets a NAV according to a relevant mechanism as a participant in multi-access point transmission, the communication node will fail to normally participate in multi-access point transmission, thus affecting normal implementation of the transmission process.

SUMMARY

The present disclosure provides a transmission method and apparatus for a wireless network, a communication node, and a non-transitory computer-readable storage medium, to improve rationality of NAV setting, so as to ensure normal implementation of multi-access point transmission.

An embodiment of the present disclosure provides a transmission method for a wireless network, applied to a first communication node, and may include: receiving a physical-layer protocol data unit (PPDU) which carries first identifier information; and keeping a locally stored NAV unchanged, or updating the locally stored NAV and ignoring the NAV in a process of multi-access point transmission.

A further embodiment of the present disclosure provides a transmission method for a wireless network, applied to a second communication node, and may include: generating a PPDU which carries first identifier information; and sending the PPDU.

A further embodiment of the present disclosure provides a transmission apparatus for a wireless network, which may include: a receiving module configured to receive a PPDU which carries first identifier information; and a configuring module configured to keep a locally stored NAV unchanged, or update the locally stored NAV and ignore the NAV in a process of multi-access point transmission.

A further embodiment of the present disclosure provides a transmission apparatus for a wireless network, which may include: a generation module configured to generate a PPDU which carries first identifier information; and a sending module configured to send the PPDU.

A further embodiment of the present disclosure provides a communication node, which may include: at least one processor; and a storage apparatus, configured to store at least one program, where the at least one program, when executed by the at least one processor, causes the at least one processor to implement the above-described transmission method for a wireless network.

A further embodiment of the present disclosure provides a non-transitory computer-readable storage medium storing a computer program, where the computer program, when executed by a processor, implements the above-described transmission method for a wireless network.

DETAILED DESCRIPTION

Figure 1:
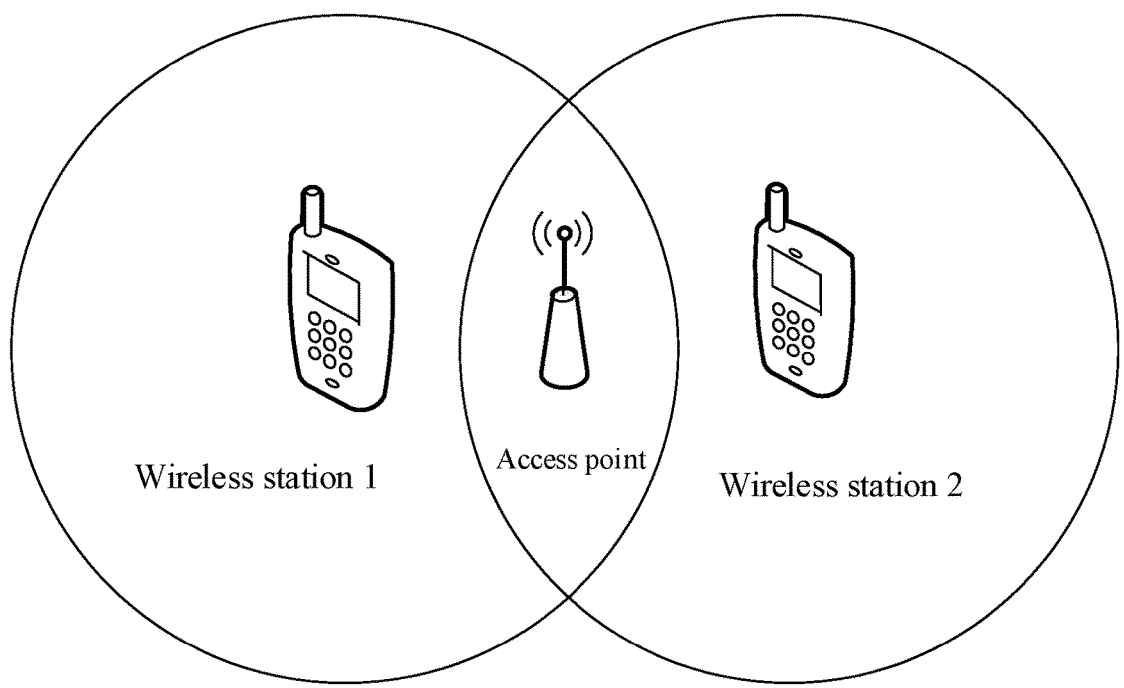
FIG. 1 is a schematic diagram of a hidden node.

The present disclosure will be described hereinafter with reference to the drawings and embodiments. It can be understood that the specific embodiments described herein are only used to explain the present disclosure and are not intended to limit the present disclosure. It should be noted that any combinations of embodiments and features of the embodiments of the present disclosure without conflict are possible. In addition, it should be further noted that for ease of description, only a part and not all structures related to the present disclosure are shown in the drawings.

Using WLAN as an example of a wireless network, common devices include an AP and a wireless STA, and STA and AP may be collectively referred to as wireless communication nodes. A next-generation WLAN supports multi-access point transmission between at least one AP and at least one STA. In a case of the wireless communication nodes sharing a channel, conflict detection in a wireless environment is difficult.

FIG. 1 is a schematic diagram of a hidden node. As shown in FIG. 1, a STA 1 and a STA 2 send data to an AP at the same time. As the STA 1 and the STA 2 are both outside the coverage of each other, a conflict may occur when the STA 1 and the STA 2 send data to the AP at the same time. The STA 2 is a hidden station relative to the STA 1. Collision with the hidden station can be avoided by including a protected channel access time (namely, a duration field) in a Media Access Control (MAC) header in a radio frame. During a time period after the end of the radio frame, other listening stations that receive the radio frame including the protected channel access time will each set a NAV stored locally, so that the listening station will not send data during the duration, avoiding collision with the hidden station due to channel contention. The listening station can send data only after the NAV is reduced to zero.

In a process of multi-access point transmission, other listening stations that can receive the data packet each need to set a NAV according to information included in the data packet, and cannot send data when the NAV is not zero, thus avoiding conflicts with communication nodes participating in multi-access point transmission. In this case, if a communication node acts as a participant in multi-access point transmission rather than an initiator, the communication node is also regarded as a listening station. If a NAV is set according to a relevant mechanism, the communication node will fail to normally participate in multi-access point transmission, thus affecting normal implementation of the transmission process.

In the embodiments of the present disclosure, there is provided a transmission method for a wireless network applied to a first communication node, which is a communication node that is triggered to perform multi-access point transmission. As a participant in multi-access point transmission, the first communication node prevents a data transmission process from being affected through reasonable setting of a NAV, thereby ensuring normal implementation of multi-access point transmission and further improving a system throughput.

Figure 2:
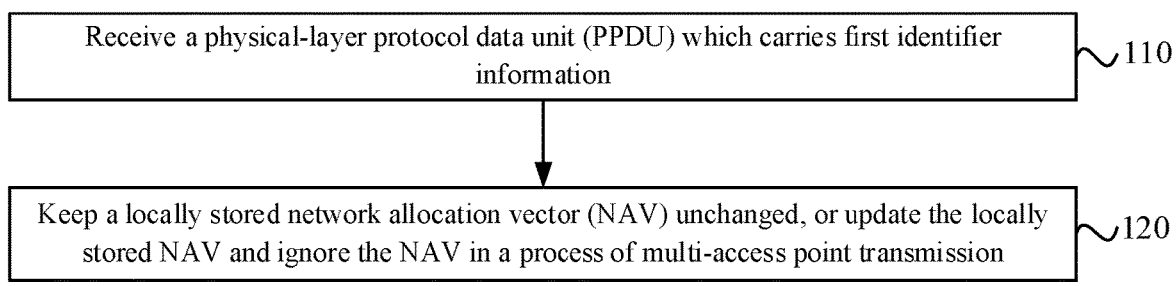
FIG. 2 is a flowchart of a transmission method for a wireless network according to an embodiment.

FIG. 2 is a flowchart of a transmission method for a wireless network according to an embodiment. A first communication node in this embodiment is equivalent to an AP. As shown in FIG. 2, the method provided in this embodiment includes step 110 and step 120.

At step 110, a PPDU which carries first identifier information is received.

At step 120, a locally stored NAV is kept unchanged, or the locally stored NAV is updated and the updated NAV is ignored in a process of multi-access point transmission.

In this embodiment, the first communication node receives the PPDU which carries the first identifier information, so that it is clear that the PPDU is used to trigger one multi-access point transmission. In this case, the first communication node keeps the locally stored NAV unchanged, or updates the locally stored NAV according to protected duration reserved by the PPDU but ignores the updated NAV in the process of multi-access point transmission. In other words, the first communication node does not need to wait for the duration specified in the NAV, but can participate in and perform transmission to a third communication node instantly according to parameters in the PPDU, thereby ensuring normal implementation of the multi-access point transmission.

In an embodiment, each communication node stores a NAV locally, including two different types: a Basic Service Set (BSS) NAV and a basic NAV. The AP establishes a BSS, and a STA can be associated with the AP through processes such as scanning, authentication, and association. One AP and multiple STAs associated with the AP form one BSS. Taking 802.11 as an example, two operation modes are defined: a Distributed coordination function (DCF) and a Point Coordination Function (PCF), as well as improvements for these two operation modes: Enhanced Distributed Channel Access (EDCA) and Hybrid Coordination Function Controlled Channel Access (HCCA). The DCF is the fundamental operation mode employing a carrier-sense multiple access with collision avoidance (CSMA/CA) mechanism to enable multiple stations to share a wireless channel. The EDCA is an enhanced operation mode, which maps upper-layer data to four different queue Access Categories (AC): Access Categories voice (AC_VO), Access Categories video (AC_VI), Access Categories best effort (AC_BE), and Access Categories background (AC_BK), each queue access category uses different parameters for channel contention to distinguish priorities. The EDCA employs the CSMA/CA mechanism to make multiple queues with different priorities share a wireless channel and reserve a transmission opportunity (Transmission Opportunity, TXOP). When receiving a radio frame, the first communication node determines whether the frame belongs to the local BSS. In response to the frame belonging to the local BSS, a local BSS NAV is set. In response to the frame not belonging to the local BSS or failing to determine whether the frame belongs to the local BSS, a basic NAV is set. When a specific condition is met, a value of the local BSS NAV can be ignored, but a value of the basic NAV cannot be ignored. It is considered that a virtual channel is sensed to be idle only when the values of both NAVs are reduced to 0, and data transmission can be started at this time.

In this embodiment, after receiving the PPDU which carries the first identifier information, the first communication node may not set the locally stored NAV, that is, keep the locally stored value unchanged, or update the locally stored NAV (the local BSS NAV) and ignore the NAV in the process of multi-access point transmission, that is, instantly participate in the multi-access point transmission.

In an embodiment, the first identifier information is used to trigger a multi-access point transmission operation. The method further includes: performing the multi-access point transmission operation according to the first identifier information.

In an embodiment, a second communication node triggers the first communication node to perform multi-access point transmission by sending the PPDU. There is at least one first communication node, and a receiver for data in the multi-access point transmission may be at least one third communication node (for example, a wireless station). The PPDU includes the first identifier information, which is used to trigger the first communication node to perform multi-access point transmission.

Figure 3:
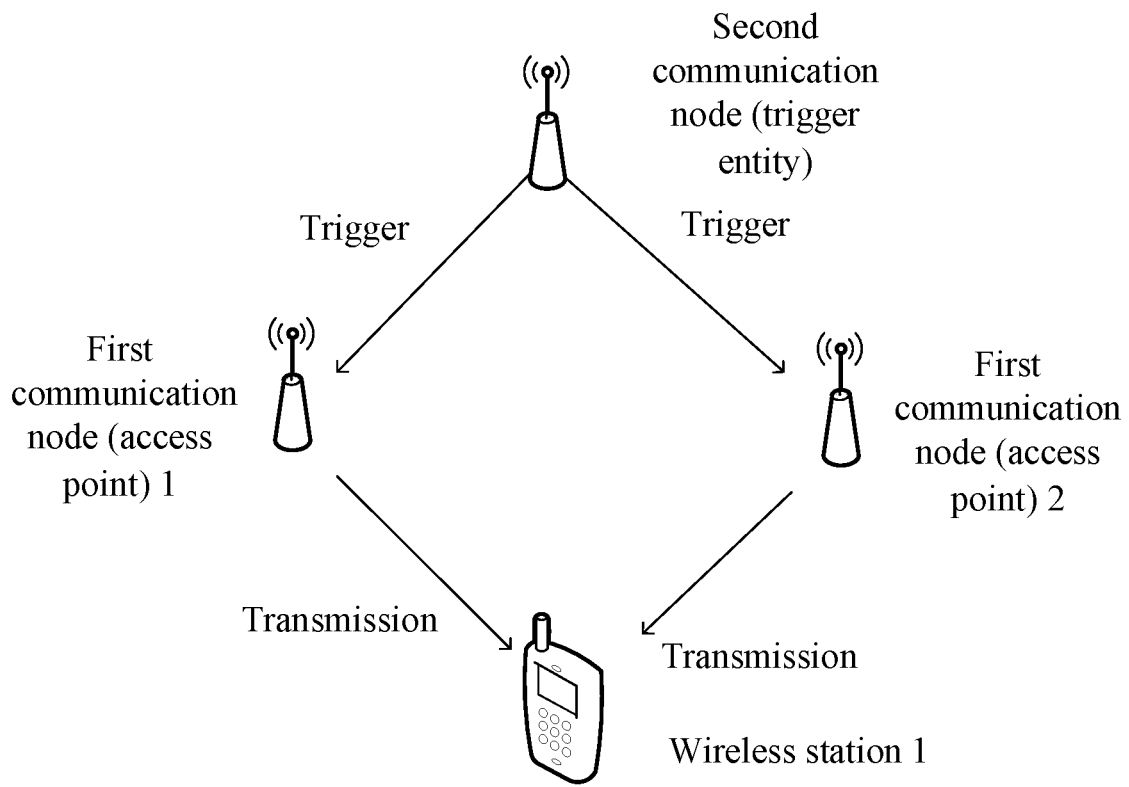
FIG. 3 is a schematic diagram of triggering multi-access point transmission according to an embodiment.

FIG. 3 is a schematic diagram of triggering multi-access point transmission according to an embodiment. With continuous evolution of the WLAN technology, multiple APs can communicate with at least one STA simultaneously or non-simultaneously, that is, multi-AP transmission. Taking simultaneous transmission of multiple APs to one STA as an example, the simultaneous transmission of multiple APs is generally triggered by a specific functional entity, which may be a specific AP or a specific device in a network. As shown in FIG. 3, the trigger entity is a second communication node, which triggers two first communication nodes to transmit data to a STA 1 simultaneously. As the multiple first communication nodes synchronize transmission moments, signals of the multiple first communication nodes do not interfere with each other and affect reception of the STA. In this process, if a triggering process is completed through an air interface, the second communication node usually needs to send a radio frame with a function of triggering transmission to the first communication node. As a result, the radio frame includes first identifier information used to trigger a multi-access point transmission operation, and may further include a protected channel access time and a receiver.

Figure 4:
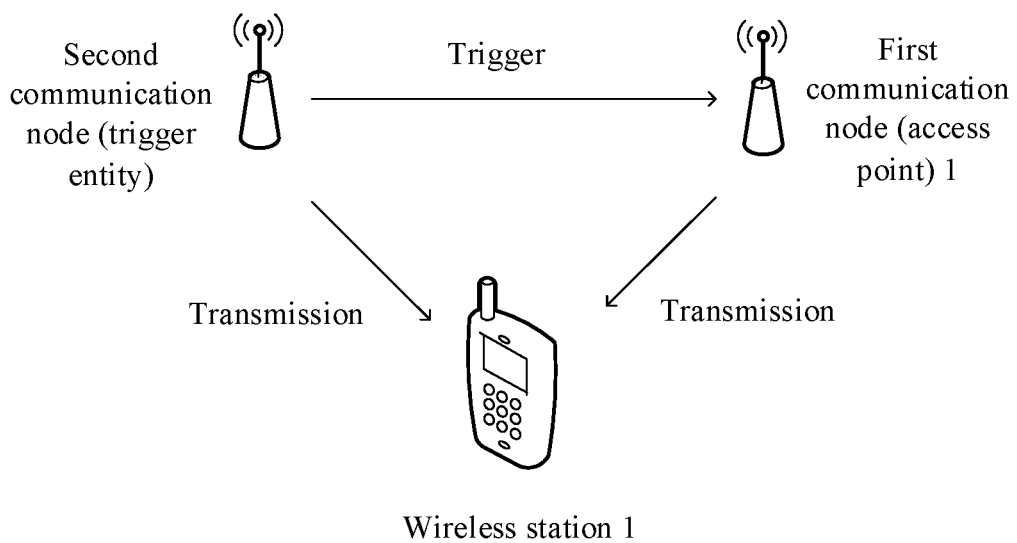
FIG. 4 is a schematic diagram of triggering multi-access point transmission according to another embodiment.

FIG. 4 is a schematic diagram of triggering multi-access point transmission according to another embodiment. As shown in FIG. 4, the second communication node triggers the first communication node and the second communication node to transmit data to a STA 1 at the same time, that is, the communication nodes that perform multi-access point transmission may include the trigger entity itself.

In the above embodiments, the second communication node may be an access point, and the first communication node may be an access point in a WLAN environment such as a home network, a commercial network, or an industrial network. The second communication node may notify whether the second communication node supports multi-access point transmission, which includes the following modes: multi-access point joint transmission (multiple APs transmit data to a STA at the same time), multi-access point selective transmission (one of multiple APs at a time transmits data to a STA), multi-access point cooperative transmission (multiple APs transmit data to respective associated STAs at the same time). The multi-access point cooperative transmission includes cooperative Orthogonal Frequency Division Multiple Access (OFDMA), cooperative frequency multiplexing, and the like. The STA notifies the AP whether the STA supports multi-access point transmission and the mode of the supported multi-access point transmission.

In an embodiment, keeping a locally stored NAV unchanged includes: classifying a PPDU as a PPDU outside a BSS according to first identifier information, and keeping the locally stored NAV unchanged.

In this embodiment, after receiving the PPDU, the first communication node determines whether to classify the PPDU as a PPDU inside the local BSS according to the first identifier information. If the PPDU is not classified as a PPDU inside the local BSS, the locally stored NAV is kept unchanged, that is, the locally stored NAV is not updated, and data is sent until the locally stored NAV is reduced to 0.

In an embodiment, updating the locally stored NAV and ignoring the NAV in a process of multi-access point transmission includes: classifying the PPDU as a PPDU inside a BSS according to the first identifier information; and updating the locally stored NAV and ignoring the updated NAV in the process of multi-access point transmission.

In this embodiment, after receiving the PPDU, the first communication node determines whether the PPDU is classified as a PPDU inside the local BSS according to the first identifier information. If the PPDU is classified as a PPDU inside the local BSS, the locally stored NAV is updated, but the updated NAV is ignored in the process of multi-access point transmission. In other words, the first communication node does not need to wait for the duration specified in the NAV, but can participate in and perform transmission to a third communication node instantly according to parameters in the PPDU.

In an embodiment, in response to the PPDU including the first identifier information, the first communication node determines that the PPDU belongs to the local BSS. Alternatively, in response to at least one AP establishing a multi-AP transmission group, and the first communication node belonging to the multi-AP transmission group, the first communication node determines that the PPDU belongs to the local BSS. Alternatively, in response to at least one AP making a multi-AP transmission agreement, and the first communication node participating in the multi-AP transmission agreement, the first communication node determines that the PPDU belongs to the local BSS.

In an embodiment, keeping the locally stored NAV unchanged, or updating the locally stored NAV and ignoring the NAV in the process of multi-access point transmission includes: in response to the PPDU further including second identifier information, determining whether to participate in the multi-access point transmission according to the second identifier information; in response to determining to participate in the multi-access point transmission, updating the locally stored NAV and ignoring the updated NAV in the process of multi-access point transmission; and in response to determining not to participate in the multi-access point transmission, keeping the locally stored NAV unchanged.

In this embodiment, the PPDU further includes the second identifier information, which is used to indicate a receiver of a radio frame. After receiving the PPDU, the first communication node determines whether to participate in multi-access point transmission according to the second identifier information. If the first communication node determines to participate in the multi-access point transmission, the first communication node updates the locally stored NAV, but ignores the updated NAV in the process of multi-access point transmission. In other words, the first communication node does not need to wait for the duration specified in the NAV, but can participate in and perform transmission to the third communication node instantly according to the parameters in the PPDU. If the first communication node determines not to participate in the multi-access point transmission, the first communication node keeps the locally stored NAV unchanged and sends data until the NAV is reduced to 0.

In an embodiment, that the locally stored NAV is updated includes: comparing the locally stored NAV (a local BSS NAV) with protected channel access duration corresponding to the PPDU, and setting a greater value of the two as a new local BSS NAV.

In an embodiment, the first identifier information is indicated by a first setting field in a MAC header in a radio frame in the PPDU, or indicated by a second setting field in a physical-layer signaling field in the PPDU; and in response to the PPDU further including second identifier information, the second identifier information is indicated by a third setting field in the MAC header in the radio frame in the PPDU, or indicated by a fourth setting field in the physical-layer signaling field in the PPDU.

The first identifier information has multiple representations. For example, the first identifier information is located in the MAC header in the radio frame in the PPDU, which may be specifically at least one bit in a frame control field in a MAC header in a trigger frame used to trigger another wireless communication node to perform transmission. It indicates that the radio frame is used to trigger or notify at least one first communication node to perform one multi-access point transmission. For another example, the first identifier information may be represented by a trigger type field in the MAC header in the trigger frame, indicating that the radio frame is used to trigger at least one first communication node to perform one multi-access point transmission. For another example, the first identifier information is located in the physical-layer signaling field in the PPDU, indicating that the radio frame is used to trigger at least one first communication node to perform one multi-access point transmission.

In an embodiment, the PPDU may further include the second identifier information to indicate the receiver, which may specify a specific communication node as the receiver, or indicate a multicast or broadcast form.

The second identifier information has multiple representations. For example, the second identifier information is located in the MAC header in the radio frame in the PPDU, with a form of a MAC address or identifier of the third communication node, and a communication node corresponding to the second identifier information is the receiver. The second identifier information may alternatively be in a form of a multicast or broadcast address or identifier, indicating that the receiver is at least one third communication node. For another example, the second identifier information refers to several values reserved from a value range of an Association ID (AID) assigned to the wireless station, for assigning to the wireless communication nodes. For example, if the value range of AID is 0 to N, the $0^{th}$ to $M^{th}$ values or the $(N-M)^{th}$ to $N^{th}$ values in the value range are assigned to the wireless communication nodes. The AID assigned to the wireless communication nodes may be negotiated between the wireless communication nodes, or completed by a specific entity, for example, a central control node in the network.

Figure 5:
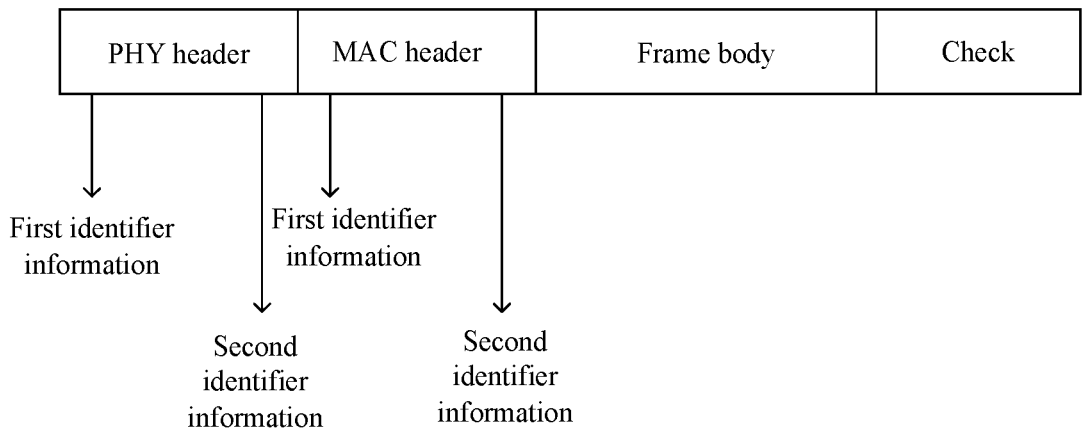
FIG. 5 is a schematic diagram of a frame structure in a WLAN according to an embodiment.

FIG. 5 is a schematic diagram of a frame structure in a WLAN according to an embodiment. As shown in FIG. 5, a PHY header and/or a MAC header may include, in addition to first identifier information, second identifier information used to indicate a receiver.

In an embodiment, a locally stored NAV is a NAV for multi-access point transmission.

In this embodiment, the NAV stored locally in the first communication node further includes, in additional to a local BSS NAV and a basic NAV, the NAV for multi-access point transmission. In a case of adding the NAV for multi-access point transmission, the first communication node can consider that a virtual channel is sensed to be idle when all three NAVs are reduced to 0, and can send data at this time.

In an embodiment, after receiving a PPDU, the first communication node determines whether the PPDU is used to trigger multi-access point transmission according to the first identifier information. If the PPDU is not used to trigger multi-access point transmission, the NAV for multi-access point transmission is kept unchanged. If the PPDU is used to trigger multi-access point transmission, the NAV for multi-access point transmission is updated but the updated NAV is ignored in a process of multi-access point transmission, which is performed according to parameters in the PPDU.

In an embodiment, after receiving the PPDU, the first communication node determines whether the PPDU is used in current multi-access point transmission according to the second identifier information. If the PPDU is not used, the NAV for multi-access point transmission is kept unchanged. If the PPDU is used, the NAV for multi-access point transmission is updated but the updated NAV is ignored in the process of multi-access point transmission, which is performed according to the parameters of the PPDU.

In an embodiment, that the NAV for multi-access point transmission is updated includes: comparing the locally stored NAV for multi-access point transmission with protected channel access duration corresponding to the PPDU, and setting a greater value of the two as a new NAV for multi-access point transmission.

In the transmission method for a wireless network described in the above embodiment, the first communication node, as a participant in the multi-access point transmission, prevents a data transmission process from being affected through reasonable setting of the NAV in the case that the PPDU belongs to the local BSS or the PPDU participates in the current multi-access point transmission, thereby ensuring normal implementation of the multi-access point transmission and further improving a system throughput.

In the embodiments of the present disclosure, there is also provided a transmission method for a wireless network applied to a second communication node, which triggers at least one first communication node to perform multi-access point transmission by sending a PPDU which carries first identifier information, so that the first communication node reasonably sets a NAV according to the first identifier information. This ensures instant transmission of the first communication node, thereby ensuring normal implementation of multi-access point transmission. The second communication node in this embodiment correspondingly interacts with the first communication node in the foregoing embodiment. For technical details not described in detail in this embodiment, reference may be made to any of the foregoing embodiments.

Figure 6:
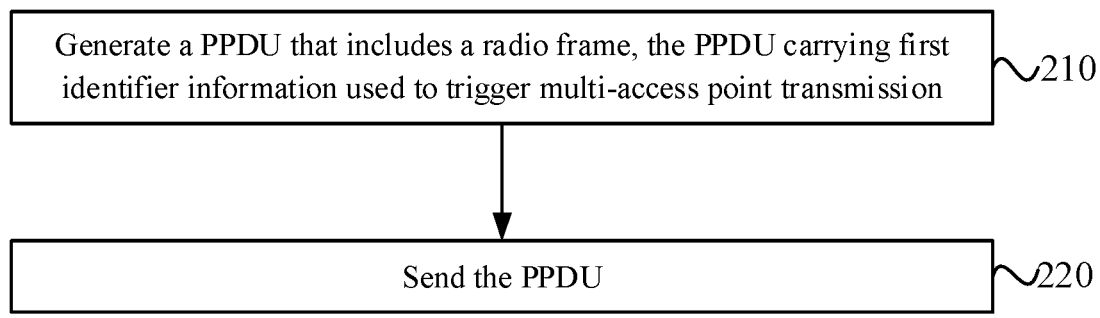
FIG. 6 is a flowchart of a transmission method for a wireless network according to another embodiment.

FIG. 6 is a flowchart of a transmission method for a wireless network according to another embodiment. As shown in FIG. 6, the method provided in this embodiment includes step 210 and step 220.

At step 210, a PPDU which carries first identifier information is generated.

At step 220, the PPDU is sent.

In this embodiment, the second communication node triggers the first communication node to perform multi-access point transmission by sending the PPDU. There is at least one first communication node, and a receiver for data in the multi-access point transmission may be at least one third communication node (for example, a wireless station). The PPDU includes the first identifier information used to instruct the first communication node to participate in and perform multi-access point transmission. The second communication node is, for example, the trigger entity in FIG. 3, and the communication nodes that are triggered to perform multi-access point transmission may also include the second communication node itself.

In an embodiment, the first identifier information is used to trigger at least one communication node to perform a multi-access point transmission operation.

In an embodiment, the PPDU further includes: second identifier information used to indicate a receiver for a radio frame.

In an embodiment, the first identifier information is indicated by a first setting field in a MAC header in a radio frame in the PPDU, or indicated by a second setting field in a physical-layer signaling field in the PPDU; and in response to the PPDU further including second identifier information, the second identifier information is indicated by a third setting field in the MAC header in the radio frame in the PPDU, or indicated by a fourth setting field in the physical-layer signaling field in the PPDU.

Figure 7:
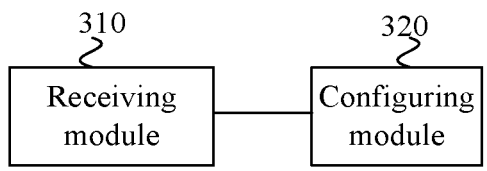
FIG. 7 is a schematic diagram of a transmission apparatus for a wireless network according to an embodiment.

A further embodiment of the present disclosure provides a transmission apparatus for a wireless network. FIG. 7 is a schematic diagram of a transmission apparatus for a wireless network according to an embodiment. As shown in FIG. 7, the transmission apparatus for a wireless network includes: a receiving module 310 and a configuring module 320.

The receiving module is configured to receive a PPDU which carries first identifier information.

The configuring module 320 is configured to keep a locally stored NAV unchanged, or update the locally stored NAV and ignore the NAV in a process of multi-access point transmission.

The transmission apparatus for a wireless network in this embodiment prevents a data transmission process from being affected through reasonable setting of the NAV, thereby ensuring normal implementation of the multi-access point transmission and further improving a system throughput.

In an embodiment, the first identifier information is used to trigger a multi-access point transmission operation; and the apparatus further includes: an execution module configured to perform the multi-access point transmission operation according to the first identifier information.

In an embodiment, the configuring module 320 includes: a keeping unit configured to classify the PPDU as a PPDU outside a BSS according to the first identifier information, and keep the locally stored NAV unchanged.

In an embodiment, the configuring module 320 includes: an update unit configured to classify the PPDU as a PPDU inside the BSS according to the first identifier information; and update the locally stored NAV and ignore the updated NAV in the process of multi-access point transmission.

In an embodiment, the configuring module 320 is specifically configured to: in response to the PPDU further including second identifier information, determine whether to participate in the multi-access point transmission according to the second identifier information; in response to determining to participate in the multi-access point transmission, update the locally stored NAV and ignore the updated NAV in the process of multi-access point transmission; and in response to determining not to participate in the multi-access point transmission, keep the locally stored NAV unchanged.

In an embodiment, the first identifier information is indicated by a first setting field in a MAC header in a radio frame in the PPDU, or indicated by a second setting field in a physical-layer signaling field in the PPDU.

In an embodiment, the second identifier information is indicated by a third setting field in the MAC header in the radio frame in the PPDU, or indicated by a fourth setting field in the physical-layer signaling field in the PPDU.

In an embodiment, the locally stored NAV is a NAV for multi-access point transmission.

For the transmission apparatus proposed in this embodiment, reference may be made to the transmission method proposed in the foregoing embodiment. For technical details not described in detail in this embodiment, reference may be made to any of the foregoing embodiments, and this embodiment has the same beneficial effects as performing the transmission method.

Figure 8:
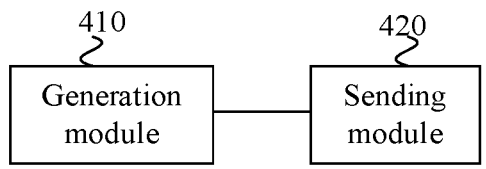
FIG. 8 is a schematic diagram of a transmission apparatus for a wireless network according to another embodiment.

A further embodiment of the present disclosure provides a transmission apparatus for a wireless network, including: FIG. 8 is a schematic diagram of a transmission apparatus for a wireless network according to another embodiment. As shown in FIG. 8, the transmission apparatus for a wireless network includes: a generation module 410 and a sending module 420.

The generation module 410 is configured to generate a PPDU which carries first identifier information; and the sending module 420 is configured to send the PPDU.

The transmission apparatus for a wireless network in this embodiment triggers at least one first communication node to perform multi-access point transmission by sending the PPDU which carries the first identifier information, so that the first communication node reasonably sets a NAV according to the first identifier information. This ensures instant transmission of a first communication node, thereby ensuring normal implementation of multi-access point transmission. The second communication node in this embodiment correspondingly interacts with the first communication node in the foregoing embodiment. For technical details not described in detail in this embodiment, reference may be made to any of the foregoing embodiments.

In an embodiment, the first identifier information is used to trigger at least one communication node to perform a multi-access point transmission operation.

In an embodiment, the PPDU further includes: second identifier information used to indicate a receiver for a radio frame.

In an embodiment, the first identifier information is indicated by a first setting field in a MAC header in a radio frame in the PPDU, or indicated by a second setting field in a physical-layer signaling field in the PPDU.

In an embodiment, the second identifier information is indicated by a third setting field in the MAC header in the radio frame in the PPDU, or indicated by a fourth setting field in the physical-layer signaling field in the PPDU.

For the transmission apparatus for a wireless network proposed in this embodiment, reference may be made to the transmission method for a wireless network proposed in the foregoing embodiment. For technical details not described in detail in this embodiment, reference may be made to any of the foregoing embodiments, and this embodiment has the same beneficial effects as performing the transmission method.

A further embodiment of the present disclosure provides a communication node. The transmission method for a wireless network may be performed by a transmission apparatus for the wireless network, and the transmission apparatus for the wireless network may be implemented by software and/or hardware, and integrated in the communication node.

Figure 9:
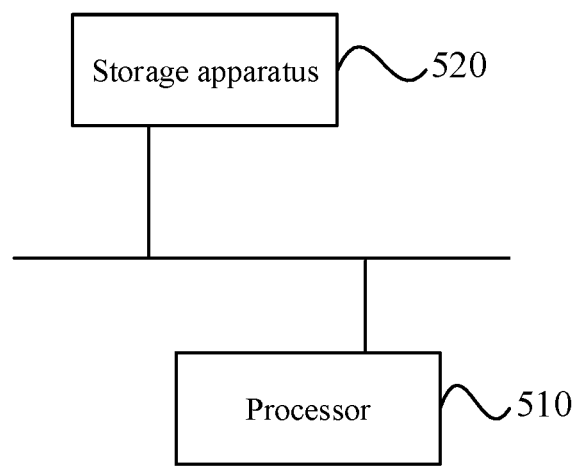
FIG. 9 is a schematic diagram of a hardware structure of a communication node according to an embodiment.

FIG. 9 is a schematic diagram of a hardware structure of a communication node according to an embodiment. As shown in FIG. 9, this embodiment provides a communication node, including: a processor 510 and a storage apparatus 520. There may be one or more processors 510 in the communication node. In FIG. 9, one processor 510 is taken as an example. The processor 510 and the storage apparatus 520 in the communication node may be connected by a bus or in another manner. Connection by a bus is used as an example in FIG. 9.

The at least one program, when executed by the at least one processor 510, causes the at least one processor 510 to implement the transmission method for a wireless network according to any one of the foregoing embodiments.

The storage apparatus 520 in the communication node, as a computer-readable storage medium, can be used to store at least one program, which may be a software program, a computer-executable program, or modules, such as program instructions/modules (for example, the modules in the transmission apparatus for a wireless network shown in FIG. 7, including the receiving module 310 and the configuring module 320) corresponding to the transmission method for a wireless network in the embodiments of the present invention. The processor 510 executes various functional applications and data processing of the communication node by running the software program, instructions and modules stored in the storage apparatus 520, that is, implements the transmission method for a wireless network in the foregoing method embodiment.

The storage apparatus 520 mainly includes a storage program area and a storage data area, where the storage program area may store an operating system and application program(s) required by at least one function, and the storage data area may store data created according to the use of a device (for example, the first identifier information, or the NAV in the foregoing embodiment). In addition, the storage apparatus 520 may include a high-speed random access memory and a non-volatile memory, for example, at least one magnetic disk storage device, a flash memory device, or another non-volatile solid-state storage device. In some examples, the storage apparatus 520 may further include memories remotely located with respect to the processor 510, and these remote memories may be connected to communication nodes via a network. Examples of the above-mentioned network include the Internet, an intranet, a local area network, a mobile communication network, and a combination thereof.

In addition, when the at least one program included in the communication node is executed by the at least one processor 510, the following operations are implemented: receiving a PPDU which carries first identifier information; and keeping a locally stored NAV unchanged, or updating the locally stored NAV and ignoring the NAV in a process of multi-access point transmission. In this case, the communication node in this embodiment refers to the first communication node that is triggered.

Alternatively, when the at least one program included in the communication node is executed by the at least one processor 510, the following operations are implemented: generating a PPDU which carries first identifier information; and sending the PPDU. In this case, the communication node in this embodiment refers to a second communication node for triggering multi-access point transmission.

For the communication node proposed in this embodiment, reference may be made to the transmission method for a wireless network proposed in the foregoing embodiment. For technical details not described in detail in this embodiment, reference may be made to any of the foregoing embodiments, and this embodiment has the same beneficial effects as performing the transmission method for a wireless network.

A further embodiment of the present disclosure provides a storage medium including computer-executable instructions which, when executed by a computer processor, cause a transmission method for a wireless network to be performed.

Through the description of the above embodiments, those of ordinary skill in the art can understand that the present disclosure may be implemented by means of software and general-purpose hardware, or may be implemented by hardware. Based on this understanding, the technical schemes of the present disclosure may be embodied in the form of software products, which may be stored in a computer-readable storage medium (such as a floppy disk, read-only memory (ROM), random access memory (RAM), flash, hard disk and optical disk) and include a plurality of instructions to cause a computer device (such as a personal computer, a server, or a network device) to perform the transmission method for a wireless network described in any one of embodiments in the present disclosure.

The above-described embodiments are only example embodiments of the present disclosure, and are not intended to limit the scope of protection of the present disclosure.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A transmission method for a wireless network, applied to a first communication node and comprising:
   receiving a physical-layer protocol data unit (PPDU) which carries first identifier information;
   determining whether to classify the PPDU as a PPDU outside a basic service set, BSS, or as a PPDU inside the BSS;
   in response to classifying the PPDU as a PPDU outside the BSS, keeping a locally stored network allocation vector (NAV) unchanged; and
   in response to classifying the PPDU as a PPDU inside the BSS, updating the locally stored NAV and ignoring the updated NAV in a process of multi-access point transmission;
   wherein the determining whether to classify the PPDU as a PPDU outside a basic service set, BSS, or as a PPDU inside the BSS comprises:
   in response to at least one access point establishing a multi-access point transmission group and the first communication node belonging to the multi-access point transmission group, determining to classify the PPDU as a PPDU inside the BSS; or
   in response to at least one access point making a multi-access point transmission agreement and the first communication node participating in the multi-access point transmission agreement, determining to classify the PPDU as a PPDU inside the BSS.

2. The method of claim 1, wherein:
   the first identifier information is used to trigger a multi-access point transmission operation; and
   the method further comprises:
   performing the multi-access point transmission operation according to the first identifier information.

3. The method of claim 1, further comprising:
   in response to the PPDU further comprising second identifier information, determining whether to participate in the multi-access point transmission according to the second identifier information;
   in response to determining to participate in the multi-access point transmission, updating the locally stored NAV and ignoring the updated NAV in the process of multi-access point transmission; and
   in response to determining not to participate in the multi-access point transmission, keeping the locally stored NAV unchanged.

4. The method of claim 1, wherein:
   the first identifier information is indicated by a first setting field in a Media Access Control (MAC) header in a radio frame in the PPDU, or indicated by a second setting field in a physical-layer signaling field in the PPDU; and
   in response to the PPDU further comprising second identifier information, the second identifier information is indicated by a third setting field in the MAC header in the radio frame in the PPDU, or indicated by a fourth setting field in the physical-layer signaling field in the PPDU.

5. The method of claim 1, wherein the locally stored NAV is a NAV for multi-access point transmission.

6. A transmission method for a wireless network which is applied to a second communication node, comprising:
generating a physical-layer protocol data unit (PPDU) which carries first identifier information; and
sending the PPDU to a first communication node to cause the first communication node to:
determine whether to classify the PPDU as a PPDU outside a basic service set, BSS, or as a PPDU inside the BSS;
keep a locally stored network allocation vector, NAV, unchanged, in response to classifying the PPDU as a PPDU outside the BSS; and
update the locally stored NAV and ignore the updated NAV in a process of multi-access point transmission, in response to classifying the PPDU as a PPDU inside the BSS;
wherein the first communication node determines to classify the PPDU as a PPDU inside the BSS, in response to at least one access point establishing a multi-access point transmission group and the first communication node belonging to the multi-access point transmission group; or the first communication node determines to classify the PPDU as a PPDU inside the BSS, in response to at least one access point making a multi-access point transmission agreement and the first communication node participating in the multi-access point transmission agreement.

7. The method of claim 6, wherein the first identifier information is used to trigger at least one communication node to perform a multi-access point transmission operation.

8. The method of claim 6, wherein the PPDU further comprises:
second identifier information used to indicate a receiver of a radio frame in the PPDU.

9. The method of claim 6, wherein:
the first identifier information is indicated by a first setting field in a Media Access Control (MAC) header in a radio frame in the PPDU, or indicated by a second setting field in a physical-layer signaling field in the PPDU; and
in response to the PPDU further comprising second identifier information, the second identifier information is indicated by a third setting field in the MAC header in the radio frame in the PPDU, or indicated by a fourth setting field in the physical-layer signaling field in the PPDU.

10. A communication node, comprising:
at least one processor; and
a storage apparatus, configured to store at least one program;
wherein the at least one program, when executed by the at least one processor, causes the at least one processor to implement the transmission method for a wireless network of claim 1.

11. A non-transitory computer-readable storage medium storing a computer program, wherein the computer program, when executed by a processor, causes the processor to implement the transmission method for a wireless network of claim 1.

12. A communication node, comprising:
at least one processor; and
a storage apparatus, configured to store at least one program;
wherein the at least one program, when executed by the at least one processor, causes the at least one processor to implement the transmission method for a wireless network of claim 6.

13. A non-transitory computer-readable storage medium storing a computer program, wherein the computer program, when executed by a processor, causes the processor to implement the transmission method for a wireless network of claim 6.

* * * * *